US008624926B2

(12) United States Patent
Varadhan et al.

(10) Patent No.: US 8,624,926 B2
(45) Date of Patent: Jan. 7, 2014

(54) PANNING USING VIRTUAL SURFACES

(75) Inventors: Gokul Varadhan, San Francisco, CA (US); Daniel Barcay, San Francisco, CA (US)

(73) Assignee: Google Inc., Mountain View, CA (US)

(*) Notice: Subject to any disclaimer, the term of this patent is extended or adjusted under 35 U.S.C. 154(b) by 885 days.

(21) Appl. No.: 12/423,334

(22) Filed: Apr. 14, 2009

(65) Prior Publication Data

US 2009/0256840 A1 Oct. 15, 2009

Related U.S. Application Data

(60) Provisional application No. 61/044,754, filed on Apr. 14, 2008.

(51) Int. Cl.
*G09G 5/00* (2006.01)
*G06F 3/048* (2013.01)

(52) U.S. Cl.
USPC ............ 345/653; 715/848; 715/850; 715/858

(58) Field of Classification Search
USPC .................. 345/563, 173, 653, 419; 715/850, 715/856–859
See application file for complete search history.

(56) References Cited

U.S. PATENT DOCUMENTS

| 5,557,714 | A * | 9/1996 | Lines et al. ................... 345/653 |
| 2005/0187015 | A1 | 8/2005 | Suzuki et al. |
| 2007/0206030 | A1 | 9/2007 | Lukis |
| 2009/0292989 | A1 | 11/2009 | Matthews et al. |

FOREIGN PATENT DOCUMENTS

EP  1 369 822 A2  12/2003

OTHER PUBLICATIONS

Ji "Dynamic View Selection for Time-Varying Volumes", IEEE Transaction on Visualization and Computer Graphics, vol. 12, No. 5, Sep./Oct. 2006.*
Henriksen et al., "Virtual Trackballs Revisited," IEEE Transactions on Visualization and Computer Graphics, IEEE Service Center, Los Alamitos, CA, vol. 10, No. 2, Mar. 1, 2004, pp. 206-216.
Chu-Yu Tang et al., "A Virtual Reality-Based Surgical Simulation System for Virtual Neuroendoscopy," IEEE International Conference on Integration Technology Integration Technology, Mar. 1, 2007, pp. 253-258.
Hachet, Martin et al., "Navidget for Easy 3D Camera Positioning From 2D Inputs,", 2008 IEEE Symposium on 3D User Interfaces, Mar. 8, 2008, pp. 83-89.
Zeleznik, R. C. et al., "Two Pointer Input for 3D Interaction," Proceedings of the 1997 Symposium on Interactive 3D Graphics, 1997, pp. 115-119.

(Continued)

*Primary Examiner* — Tize Ma
*Assistant Examiner* — Yingchun He
(74) *Attorney, Agent, or Firm* — Sterne, Kessler, Goldstein & Fox P.L.L.C.

(57) ABSTRACT

The present invention relates to panning a virtual camera in a three dimensional environment. In an embodiment of the present invention, a computer-implemented method pans a virtual camera in a three dimensional environment. In the method embodiment, a first point is determined on a three dimensional model in the three dimensional environment. According to the first point, the three dimensional model, and a position of a virtual camera in the three dimensional environment, a virtual surface is determined. A second point is determined on the virtual surface. Finally, a location of the three dimensional model is changed according to the first point and the second point.

15 Claims, 9 Drawing Sheets

(56) References Cited

OTHER PUBLICATIONS

PCT, "Notification of Transmittal of the International Search Report and the Written Opinion of the International Search Authority, or the Declaration," International Application, PCT/US2009/002311, mailed Aug. 14, 2009.

PCT, Notification of Transmittal of the International Search Report and the Written Opinion of the International Searching Authority, or the Declaration and Written Opinion of the International Search Authority; mailed Sep. 23, 2010; International Appln. No. PCT/US2009/054727, International Filing Date: Aug. 24, 2009; 14 pages.

Matsushita et al., "Dual Touch: A Two-Handed Interface for Pen-Based PDAs," Interaction Laboratory, Sony Computer Science Laboratories Inc., Tokyo, Japan, UIST '00 Proceedings of the 13th annual ACM symposium on User interface software and technology, pp. 211-212.

\* cited by examiner

Standard Track Ball Panning

PANNING USING VIRTUAL SURFACES

FIELD OF THE INVENTION

The present invention relates to moving a virtual camera in a three dimensional environment.

BACKGROUND

Systems exist for navigating through a three dimensional environment to display three dimensional data. The three dimensional environment includes a virtual camera. The virtual camera has a perspective that defines what three dimensional data to display to a user. The user may input data that pans the virtual camera. By panning the virtual camera, the user navigates in the three dimensional environment.

One type of system that pans a virtual camera to navigate in a three dimensional environment is a geographic information system. A geographic information system is a system for storing, retrieving, manipulating, and displaying a three dimensional model of the Earth. The three dimensional model may include satellite images texture mapped to terrain, such as mountains, valleys, and canyons. Further, the three dimensional model may include buildings and other three dimensional features.

As the virtual camera's perspective becomes tangential to the Earth, panning becomes increasingly unstable. A small change to the user's input pans the virtual camera large distances. This can be disorienting for the user.

Systems and methods are needed for more stable panning in a three dimensional environment.

BRIEF SUMMARY

The present invention relates to panning in a three dimensional environment. In an embodiment of the present invention, a computer-implemented method pans a virtual camera in a three dimensional environment. In the method embodiment, a first point is determined on a three dimensional model in the three dimensional environment. According to the first point, the three dimensional model, and a position of a virtual camera in the three dimensional environment, a virtual surface is determined. A second point is determined on the virtual surface. Finally, a location of the three dimensional model is changed according to the first point and the second point.

In a second embodiment, a system pans a virtual camera in a three dimensional environment. The system includes a panning module that determines a first point on a three dimensional model in the three dimensional environment. The panning module also determines a second point on a virtual surface. A virtual surface calculator module determines the virtual surface according to the first point, the three dimensional model, and a position of a virtual camera in the three dimensional environment. A rotator module that changes a location of the three dimensional model according to the first and second points.

In a third embodiment, a computer-implemented method pans a virtual camera in a three dimensional environment that includes a three dimensional model of the Earth. The method includes: displaying in a display area the three dimensional model from a perspective of the virtual camera, enabling a user to select a first point on the display area with a cursor, and determining a first screen ray according to the first point. The method further includes: enabling the user to move the cursor to a second point in the display area, determining a second screen ray according to the second point, and rotating the three dimensional model around an axis through a rotation point (e.g., a center) of the three dimensional model to follow the cursor at a rate defined by a panning velocity. The panning velocity is a ratio of an angle of rotation of the three dimensional model to an angle between the first screen ray and the second screen ray. The panning velocity does not exceed a threshold value.

Employing a virtual surface to pan in a three dimensional environment reduces movement of the three dimensional model when the virtual camera's perspective is nearly tangential to the three dimensional model. By reducing movement of the three dimensional model, embodiments of the present invention make panning more stable.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of the present invention relate to stable panning using virtual surfaces. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used herein, the term "panning" a virtual camera refers to rotating a three dimensional model about an axis through a rotation point, such as its center. It is important to note that moving the three dimensional model relative to the camera is equivalent to moving a camera relative to a three dimensional model.

Figure 1A:
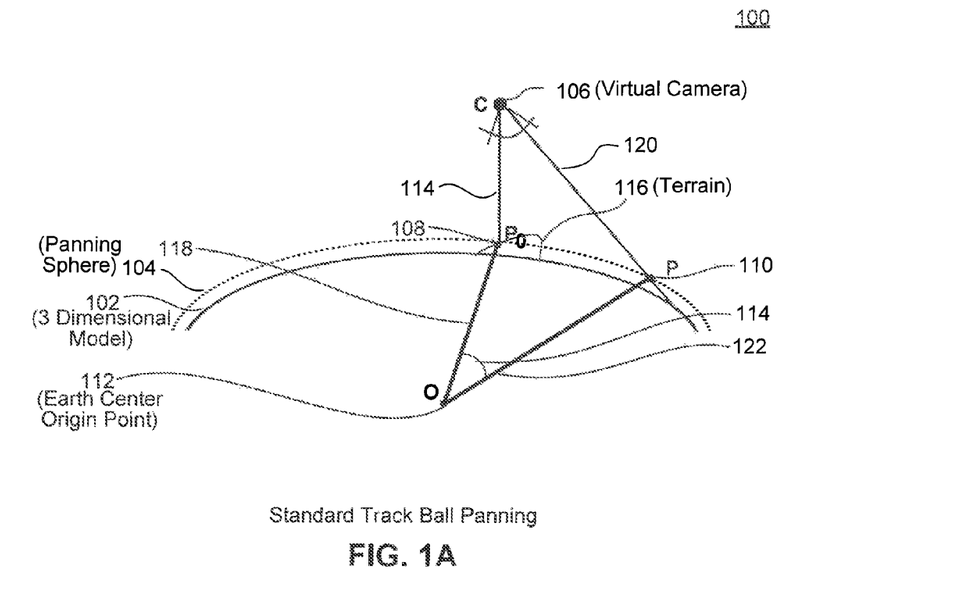
FIG. 1A is a diagram illustrating panning without a virtual surface.

FIG. 1A shows a diagram 100 illustrating trackball panning without a virtual surface. Diagram 100 shows a virtual camera 106 viewing a three dimensional geometry 102. Three dimensional geometry 102 includes terrain 116. As is described in detail below, three dimensional geometry 102 may, for example, may be a three-dimensional model of the Earth having a center origin at a point 112, and virtual camera 106 may define what portion of the three dimensional model to display to a user on a display area.

The user may select a first point on the display area. As a result, a ray 114 is extended according to the point. In an example, ray 114 may extend from a focal point of the virtual camera through a point on the viewport of the virtual camera corresponding to the point selected on the display area. How ray 114 may be determined is described in more detail with respect to FIG. 5B. Once ray 114 is determined, an intersection 108 between ray 114 and three dimensional model 102 is determined.

A panning sphere 104 is determined corresponding to point 108 and three dimensional model 102. Panning sphere 104 is a three dimensional surface used to control panning. In an example, panning sphere 104 may be a sphere with a center origin at point 112 and a radius equal to a distance between intersection 108 and point 112.

Once panning sphere 104 is determined, a user selects a second point on the display area, and three dimensional model 102 is rotated accordingly. The user may select the second point on the display area by, for example, moving a mouse to a new location. As result of the user selection, a ray 120 corresponding to the second point is determined. Once ray 120 is determined, an intersection 110 between ray 120 and panning sphere 104 is determined. A line segment 118 connects point 112 with intersection 108, and a line segment 122 connects point 112 with intersection 110. Three dimensional model 102 is rotated by an angle 114 between line segment 118 and line segment 122. In this way, by selecting a point on a display area with, for example, a mouse and moving the mouse, the user rotates the model to follow the movement of the mouse.

While standard trackball panning has advantages, it can be unstable. As ray 120 becomes increasing tangential to three dimensional model 102 and panning sphere 104, small changes to the user's selection results in large rotations of model 102. Embodiments of the present invention make panning more stable by introducing a virtual surface as described with respect to FIG. 1B.

Figure 1B:
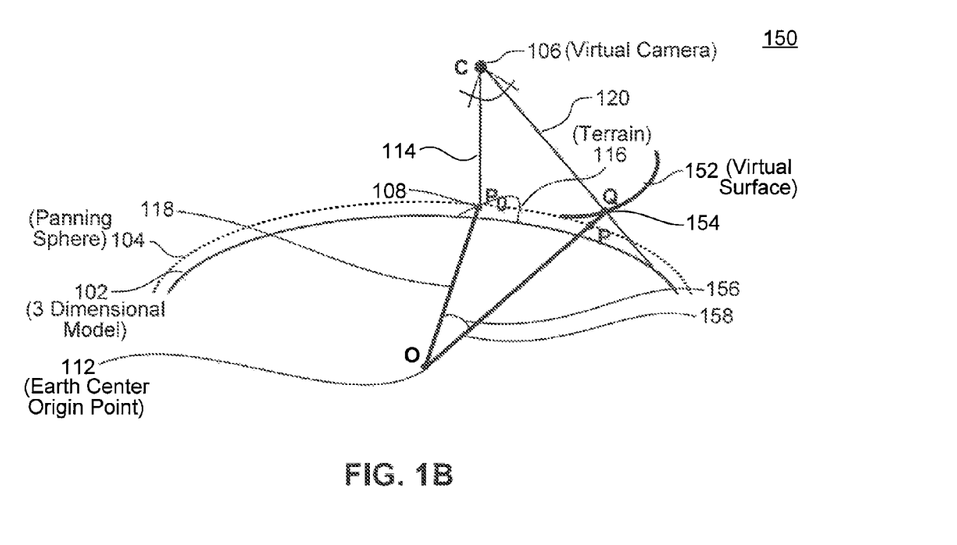
FIG. 1B is a diagram illustrating panning with a virtual surface according to an embodiment of the present invention.

FIG. 1B shows a diagram 150 illustrating panning with a virtual surface according to an embodiment of the present invention. As in diagram 100, in diagram 150 the user selects a first and second point on a display area and, as a result, the model rotates. However, the virtual surface reduces the model's rotation, thus increasing stability.

When the user selects the first point on the display area, ray 114, intersection 108, and panning sphere 104 are determined as described for diagram 100. Once panning sphere 104 is determined, a virtual surface 152 is determined. Virtual surface 152 and panning sphere 104 together form a continuous, smooth surface. Virtual surface 152 may be, for example, a concave surface opposing a portion of panning sphere 104. In one embodiment, virtual surface 152 may be a mirror image of a portion of panning sphere 104.

When the user selects the second point on the display area, ray 120 is extended according to the user selection, and three dimensional model 102 is rotated. An intersection 154 is determined between ray 120 and virtual surface 152. A line segment 158 connects point 112 and intersection 154. Model 102 is rotated by an angle 156 between line segment 158 and line segment 118. Thus, an intersection is determined using virtual surface 152, instead of panning sphere 104. In this way, the rotation of model 102 does not occur as abruptly when ray 120 becomes tangential to sphere 104.

Embodiments of the present invention are described in greater detail below with reference to the remaining figures. In particular, FIGS. 2-3 describe a geographic information system that pans using virtual surfaces. FIG. 4 describes a method that may be used in operation of the geographic information system. Finally, FIGS. 5, 6, and 7A-B include diagrams elaborating on the method.

Figure 2A:
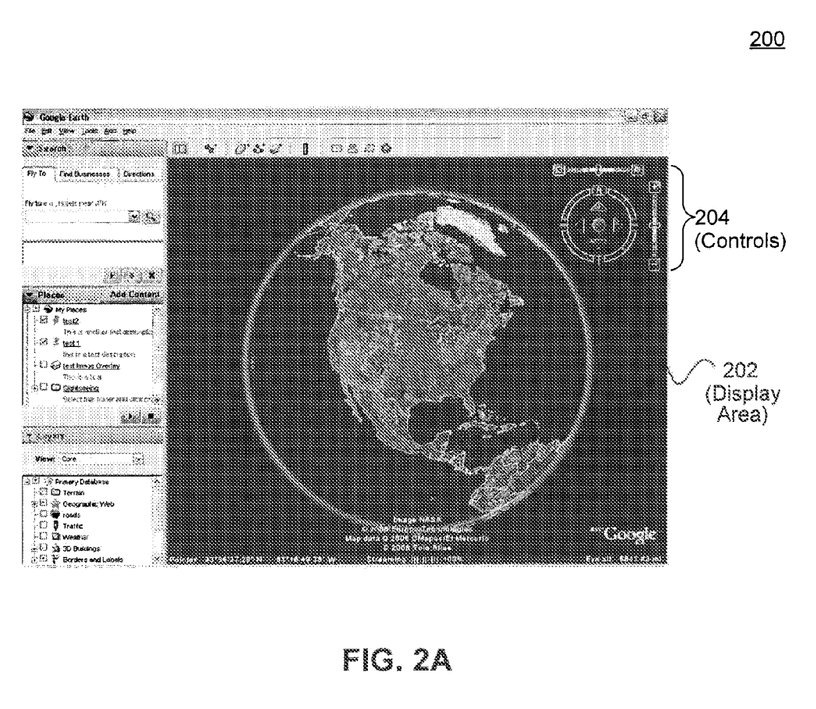
FIG. 2A is a screenshot of a user interface of a geographic information system.

FIG. 2A is a screenshot of a user interface 200 of a geographic information system, which may pan using virtual surfaces. User interface 200 includes a display area 202 for displaying geographic data. As mentioned above, the data displayed in display area 202 is from the perspective of a virtual camera. In an embodiment, the perspective is defined by a frustum such as, for example, a three dimensional pyramid with the top spliced off. Geographic data within the frustum can be displayed at varying levels of detail depending on its distance from the virtual camera.

Example geographic data displayed in display area 202 include images of the Earth. These images can be rendered onto a geometry representing the Earth's terrain creating a three dimensional model of the Earth. Other data that may be displayed include three dimensional models of buildings.

User interface 200 includes controls 204 for changing the virtual camera's orientation. Controls 204 enable a user to change, for example, the virtual camera's altitude, latitude, longitude, pitch, yaw, and roll. In an embodiment, controls 104 are manipulated using a computer pointing device such as a mouse. As the virtual camera's orientation changes, the virtual camera's frustum and the geographic data displayed also change. In addition to controls 204, a user can also control the virtual camera's orientation using other computer input devices such as, for example, a computer keyboard or a joystick.

User interface 200 may also enable a user to pan the virtual camera. A user may pan the virtual camera by selecting a first point on display area 202 with, for example, a computer pointing device. Then, the user may move the computer pointing device to select a second point on display area 202. As is described below, the geographic information system rotates the model of the Earth according to the first and second points selected by the user.

The geographic information system may operate using a client-server computer architecture. In such a configuration, user interface 200 resides on a client machine. The client machine can be a general-purpose computer with a processor, local memory, display, and one or more computer input devices such as a keyboard, a mouse and/or a joystick. Alternatively, the client machine can be a specialized computing device such as, for example, a mobile handset. The client machine communicates with one or more servers over one or more networks, such as the Internet. Similar to the client machine, the server can be implemented using any general-purpose computer capable of serving data to the client. The architecture of the geographic information system client is described in more detail with respect to FIG. 3.

Figure 2B:
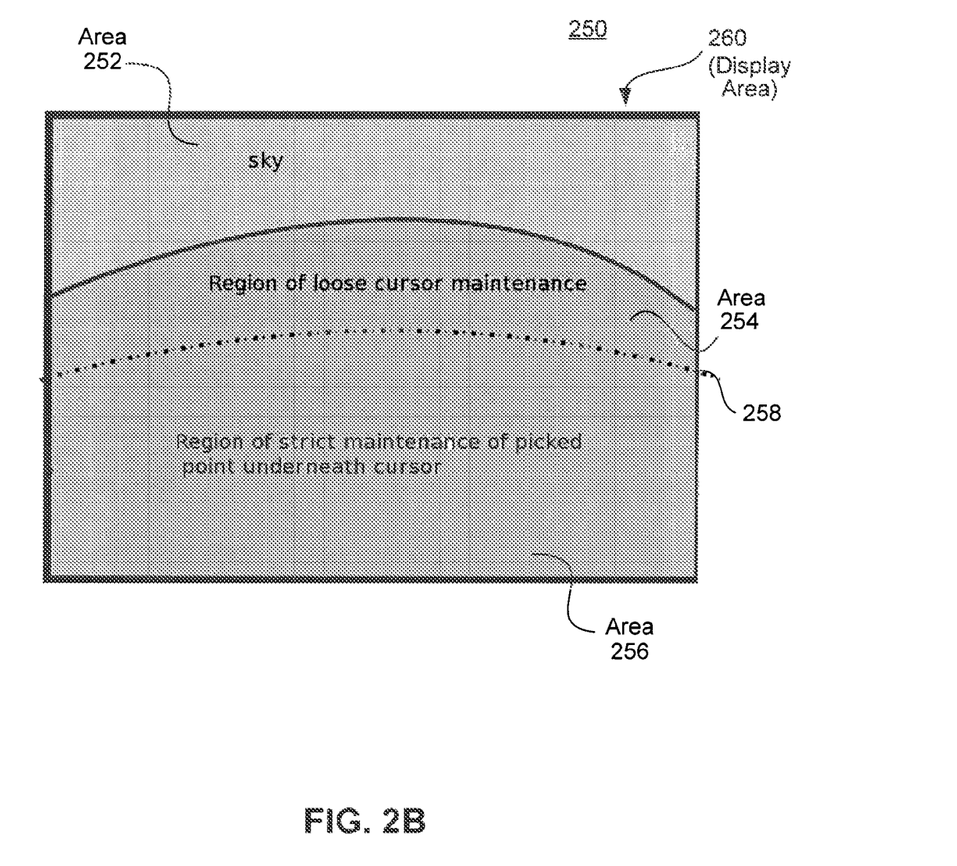
FIG. 2B is a diagram illustrating various regions of a display area used for panning with the virtual surface.

FIG. 2B shows a diagram 250 illustrating various regions of a display area 260 used for panning with the virtual surface. As described above with respect to display area 202 in FIG. 2A, display area 260 may display a three dimensional model of the Earth from the perspective of a virtual camera. A user may pan the virtual camera by selecting a first point on display area 260 with, for example, a cursor controlled by computer pointing device such as a mouse. By extending a screen ray according to the point selected by the user, a hit point in the three dimensional model may be determined. Then, the user may move the cursor to select a second point on display area 260. The three dimensional model of the Earth may rotate to follow the second point. Display area 260 includes regions 256, 254, and 252. How the model rotates to follow the second point varies depending which region includes the second point.

If the user moves the cursor to select a second point in region 256, the model rotates so that the hit point stays under the cursor. In this way, the model rotates to follow the cursor. Referring back to FIG. 1B, in region 256 a screen ray extended according to the cursor position would intersect with panning sphere 104. As the cursor moves closer to region 254, the velocity of rotation increases. When the cursor enters region 254, a screen ray extended according to the cursor position would intersect with virtual surface 152.

In an embodiment, a virtual surface may be constructed such that a velocity of rotation stays constant regardless of the position of the cursor in region 254. In other words, for any movement of a cursor by X pixels, the model rotates by a constant Y degrees. Further, that velocity may be set the velocity of rotation at a point 258 at which region 256 connects to region 254 (e.g. where the panning surface meets the virtual surface). By setting the velocity of rotation on the virtual surface equal to the velocity on the panning sphere at the intersection between the panning surface and the virtual surface, there is a smooth transition between the two surfaces. The smooth transition reduces the likelihood that the user would experience jerk in panning. Ultimately, reduced jerk results in a smoother panning experience.

In an embodiment, a virtual surface may be constructed such that panning is reversible. The model starts at a first location. A user selects a first position on display area 260. Then, the user moves the cursor to a second position on display area 260. Accordingly, the model rotates to a second location. If the user moves the cursor back to the first position on display area 260, the model rotates back to the first location. In this way, the virtual surface may be constructed such that panning is reversible.

Finally, display area 260 may optionally have a region 252 where little or no rotation occurs. In a geographic information system, region 252 may correspond to the sky or outer space. If a user moves a cursor into region 252, panning may stop. Further, a screen ray extended according to a cursor location in region 252 may not intersect with a panning sphere or a virtual surface.

Figure 3:
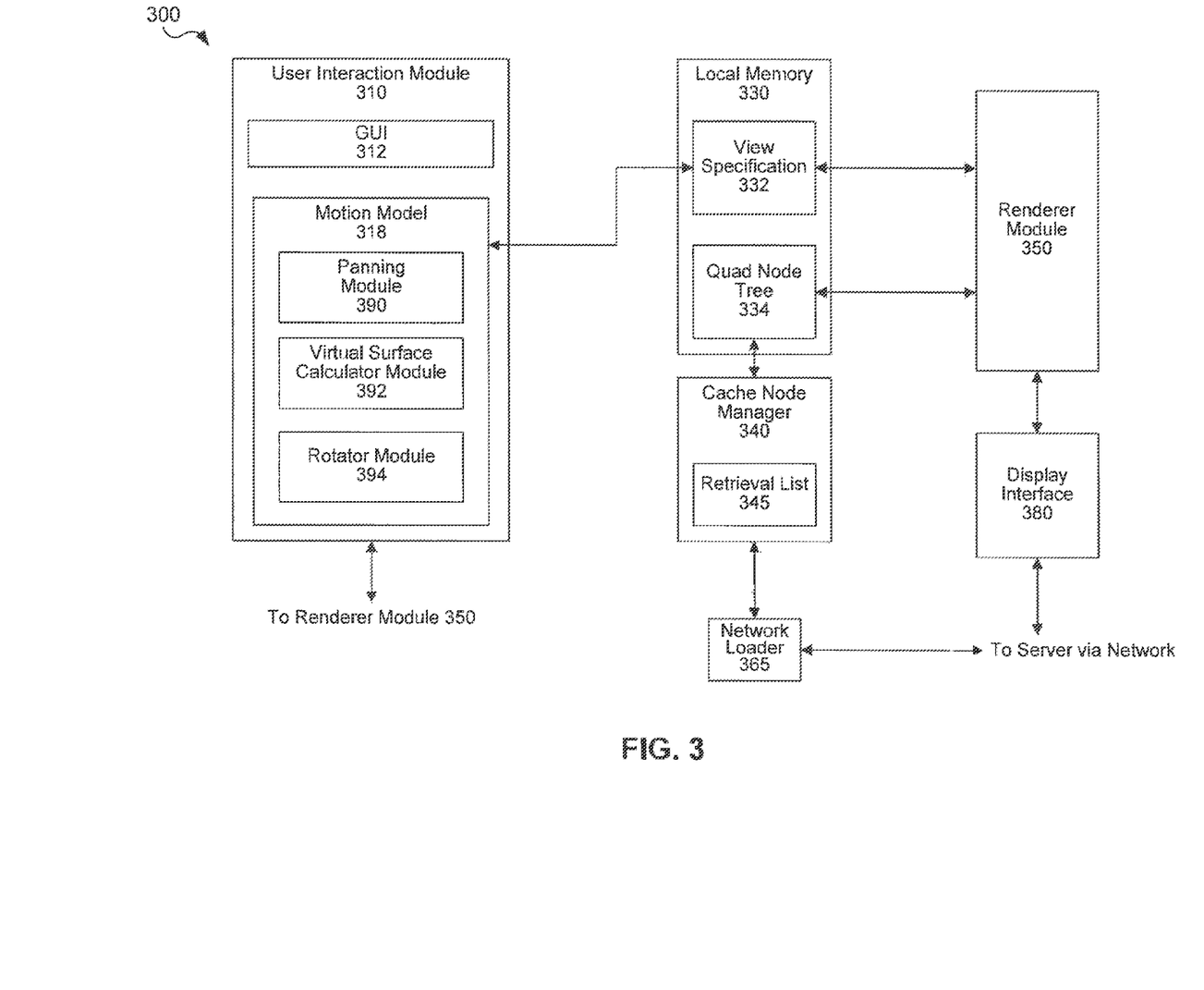
FIG. 3 is an architecture diagram of a geographic information system client that pans using virtual surfaces according to an embodiment of the present invention.
Figure 4:
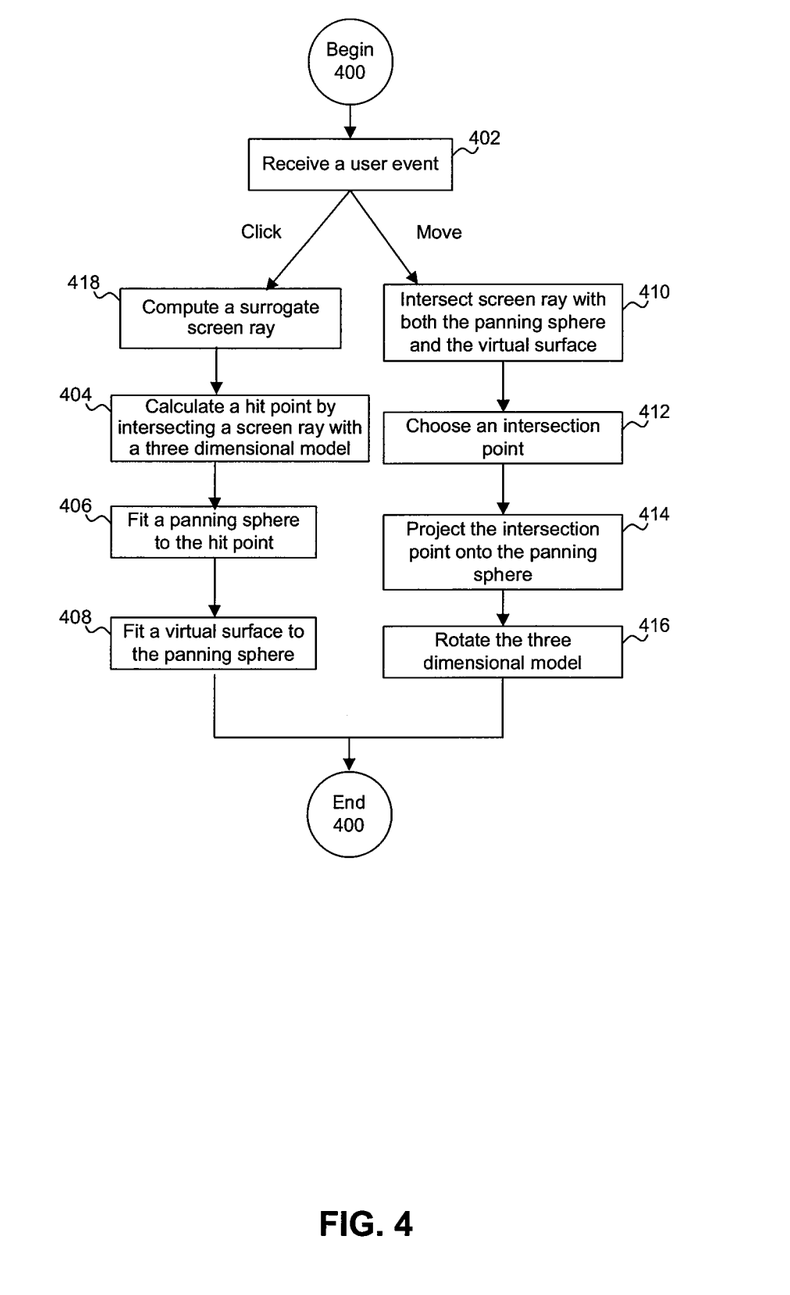
FIG. 4 is a flowchart of a method for panning using virtual surfaces, which may be used in operation of the system in FIG. 3.

FIG. 3 is an architecture diagram of an exemplary client 300 of a GIS according to an embodiment of the invention. In an embodiment, client 300 includes a user interaction module 310, local memory 330, cache node manager 340, renderer module 350, network loader 365, and display interface 380. As shown in FIG. 3, user interaction module 310 includes a graphical user interface (GUI) 312 and motion model 318. Local memory 330 includes a view specification 332 and quad node tree 334. Cache node manager 340 includes a retrieval list 345.

In an embodiment, the components of client 300 can be implemented, for example, as software running on a client machine. Client 300 interacts with a GIS server (not shown) to bring images of the Earth and other geospatial data to client 300 for viewing by a user. Together, the images of the Earth and other geospatial data form a three dimensional model in a three dimensional environment. In an embodiment, software objects are grouped according to functions that can run asynchronously (e.g., time independently) from one another.

In general, client 300 operates as follows. User interaction module 310 receives user input regarding a location that a user desires to view and, through motion model 318, constructs view specification 332. Renderer module 350 uses view specification 332 to decide what data is to be drawn and draws the data. Cache node manager 340 runs in an asynchronous thread of control and builds a quad node tree 334 by populating it with quad nodes retrieved from a remote server via a network.

In an embodiment of user interface module 310, a user inputs location information using GUI 312. This results, for example, in the generation of view specification 332. View specification 332 is placed in local memory 330, where it is used by renderer module 350.

Motion model 318 uses location information received via GUI 312 to adjust the position or orientation of a virtual camera. The camera is used, for example, for viewing a displayed three dimensional model of the Earth. A user sees a displayed three dimensional model on his or her computer monitor from the standpoint of the virtual camera. In an embodiment, motion model 318 also determines view specification 332 based on the position of the virtual camera, the orientation of the virtual camera, and the horizontal and vertical fields of view of the virtual camera.

View specification 332 defines the virtual camera's viewable volume within a three dimensional space, known as a frustum, and the position and orientation of the frustum with respect, for example, to a three dimensional map. In an embodiment, the frustum is in the shape of a truncated pyramid. The frustum has minimum and maximum view distances that can change depending on the viewing circumstances. As a user's view of a three dimensional map is manipulated using GUI 312, the orientation and position of the frustum changes with respect to the three dimensional map. Thus, as user input is received, view specification 332 changes. View specification 332 is placed in local memory 330, where it is used by renderer module 350. View specification 332 and the other components of GIS client 300 are described in greater detail below.

Motion model 318 uses several sub-modules to control panning using virtual surfaces. The sub-modules include a panning module 390, virtual surface calculator module 392, and rotator module 394. Motion model 318 accepts a user input from GUI 312. If the user input is a mouse click, motion model 318 may activate panning module 390, for example, by a function call.

Panning module 390 extends a ray according to the user input and determines an intersection between the three dimensional model and the ray. Panning module 390 also may construct a panning sphere. Once the panning sphere is constructed, virtual surface calculator module 392 may fit a virtual surface to the panning sphere.

Motion model 318 accepts a second user input from GUI 312. Panning module 390 extends another ray according to the second user input. Panning module 390 also calculates an intersection between the virtual surface and the ray. Finally, rotator module 394 rotates the three dimensional model according to the intersection. The operation of panning module 390, virtual surface calculator module 392, and rotator module 394 is described in more detail below with respect to FIGS. 4-6 and 7A-B.

FIG. 4 is a flowchart of a method 400 for panning using virtual surfaces, which may be used in operation of motion model 318 in FIG. 3. Although method 400 is described with respect to motion model 318, it is not meant to be limited to motion model 318.

Method 400 begins by receiving a user event at step 402. If the user event is a click event, a surrogate ray may be calculated at a step 418. Then, a hit point is calculated by intersecting a screen ray or the surrogate ray with the three dimensional model at step 404. At step 406, a panning sphere is fit to the hit point, and, at step 408, a virtual surface is fit to the panning sphere. The panning sphere may be generated according to the hit point as described with respect to FIG. 1B. The virtual surface may be generated according to position of the virtual camera. A mouse move event is received, and method 400 proceeds to step 410. At step 410, a screen ray is intersected with both the panning surface and the virtual surface. One of the intersection points is selected at step 412. If the selected intersection point is on the virtual surface, then it is projected onto the panning sphere in step 414. Finally, at step 416, the three dimensional model is rotated by an angle subtended by a line segment connecting the hit point determined in step 404 and the intersection point selected in step 416. Each of the steps is described in more detail below with respect to motion model 318 in FIG. 3 and diagrams in FIGS. 5A-B, 6, and 7A-B.

At step 402, GUI 312 may receive one of two user events—a click event or a move event. GUI 312 may receive the click event in response to the user clicking a mouse or other input device at a position in display area 202 in FIG. 2. GUI 312 may receive the move event when the user holds down an input device (such as a mouse) and moves the input device to a new position on display area 202. These events may result in GUI 312 making callback function calls to panning module 390. During the function call, GUI 312 may pass position information pertaining to the event to panning module 390.

Figure 5A:
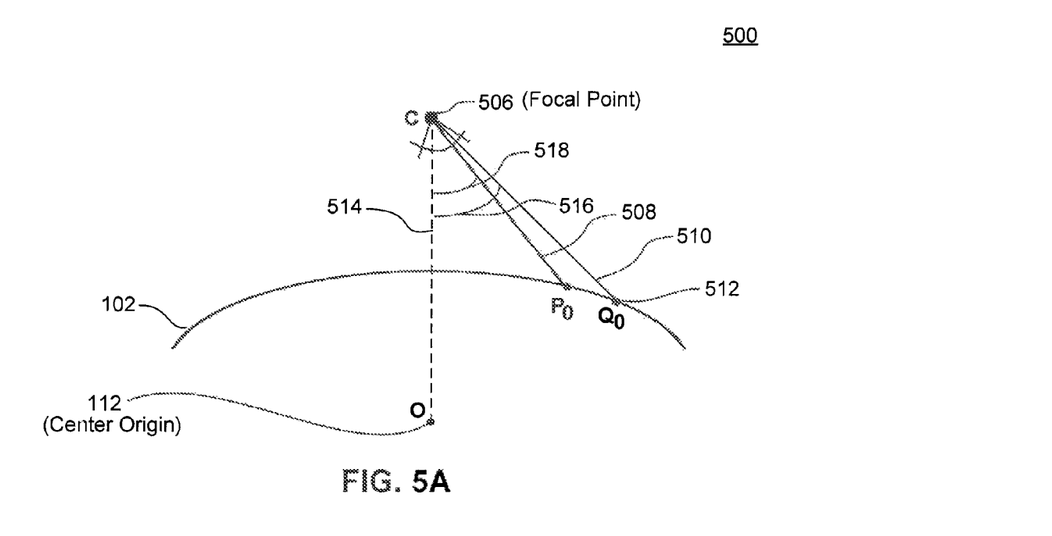
FIG. 5A is a diagram that illustrates determining a surrogate ray according to a step in the method in FIG. 4.

If the user event is a click event, panning module 390 may determine a surrogate screen ray at step 418 as illustrated in FIG. 5A. FIG. 5A shows a virtual camera with a focal point 506. Based on the click event, a screen ray 510 is determined. Determining a screen ray is described in more detail with respect to FIG. 5B. A line segment 514 connects center origin 112 and focal point 506. An angle 516 between line segment 514 and screen ray 510 exceeds a threshold value. Because angle 516 exceeds the threshold value, angle 516 is fixed to the threshold value at an angle 518. Finally, a surrogate ray 508 is extended from focal point 506 at angle 518 with respect to line segment 514.

At step 404, panning module 390 calculates a hit point by intersecting a screen ray or a surrogate ray with the three dimensional model. Step 404 is described in detail with respect to a diagram 500 in FIG. 5B. Diagram 500 shows a model of the Earth 552. Diagram 500 also shows focal point 506 of a virtual camera. The virtual camera is used to capture and to display information as described with respect to FIG. 2. The virtual camera has a focal length 558 and a viewport 560. Viewport 560 corresponds to display area 202 in FIG. 2. A user selects a position on display area 202, and the position corresponds to a point 562 on viewport 560.

Figure 5B:
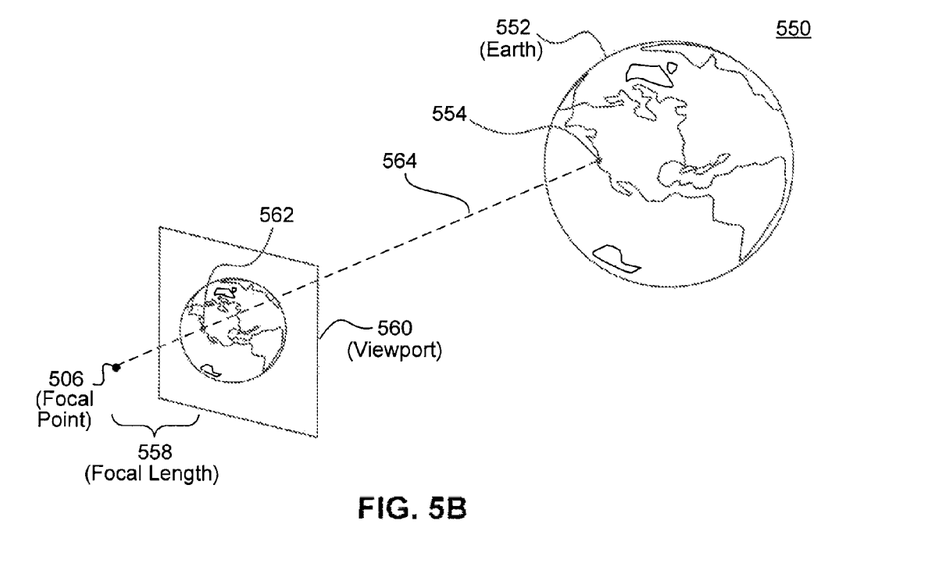
FIG. 5B is a diagram that illustrates determining a hit point according to a step in the method in FIG. 4.

Panning module determines a hit point by extending a screen ray from the virtual camera to determine an intersection with the model. In diagram 500, a ray 564 extends from focal point 506 through point 562. In another embodiment, ray 564 may be a surrogate ray computed as described with respect to FIG. 5A. Ray 564 intersects with model 552 at a location 554. Thus, the hit point is at location 554. Ray 564 may intersect with three dimensional model 552 at buildings or terrain.

Referring to FIGS. 3 and 4, if a ray intersects with buildings or terrain, panning module 390 may create a panning sphere at step 406. The center origin of the panning sphere may be located at the center of the three dimensional model, and the radius of the panning sphere may be the distance between the center of the model and the hit point determined in step 404.

Once the panning surface is determined at step 406, virtual surface calculator module 392 calculates a virtual surface at step 408. The virtual surface is fitted to the panning surface such that the virtual surface and the panning surface together form a continuous surface. The virtual surface may be a concave surface from the perspective of the virtual camera. In an example, the virtual surface is a mirror image of a portion of the panning surface.

Figure 6:
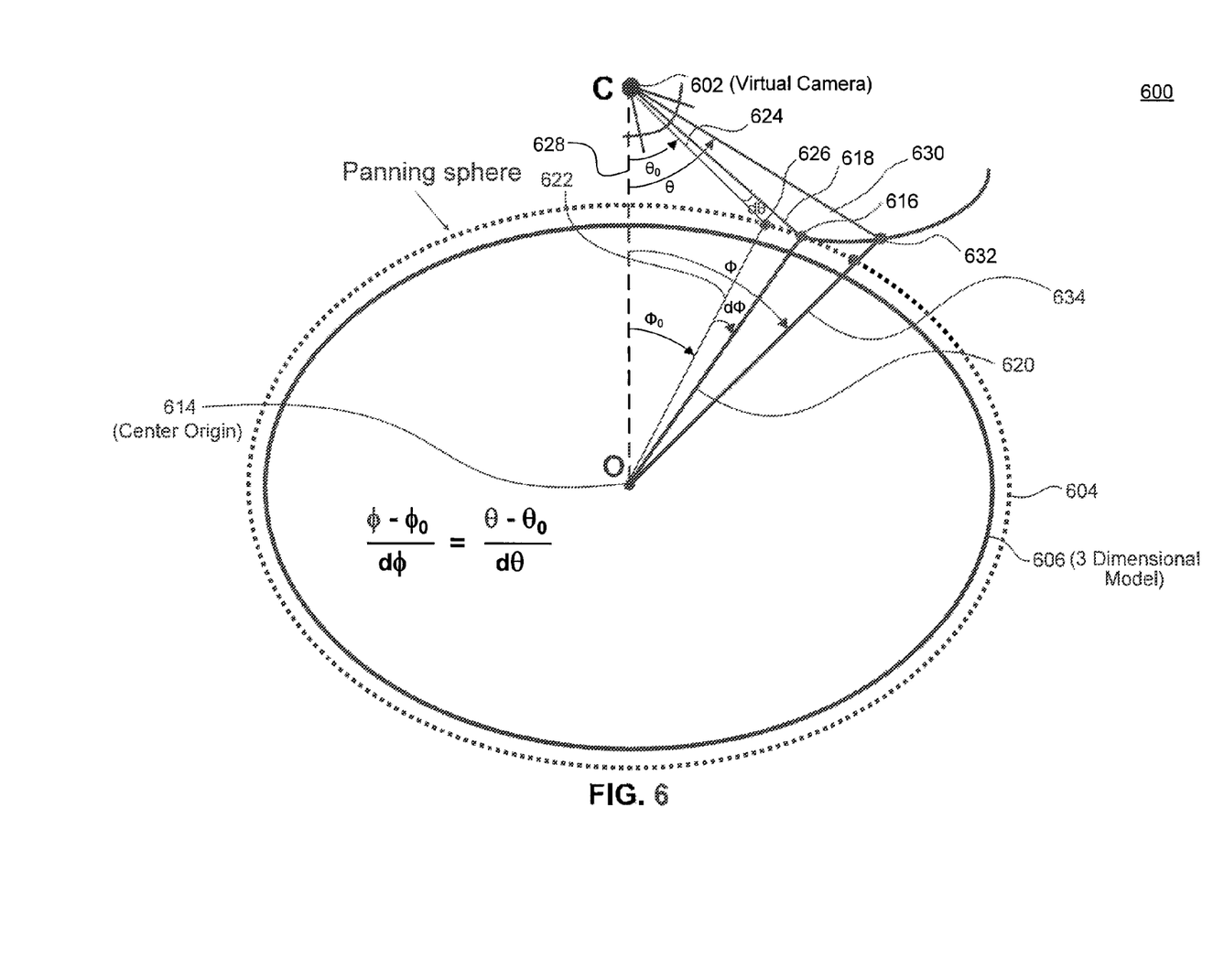
FIG. 6 is a diagram illustrating calculations for constructing a virtual surface according to a step in the method in FIG. 4.

FIG. 6 shows a diagram 600 illustrating how to calculate a virtual surface according to one embodiment of the present invention. Diagram 600 illustrates one way to calculate a virtual surface, however there are other ways to calculate a virtual surface as well. As described above, the virtual surface may also be calculated as a concave surface or a mirror image of the Earth. Diagram 600 shows a virtual camera 602 viewing a three dimensional model 606 having a center origin 614. Diagram 600 also shows a panning sphere 604.

Panning velocity is the rate at which movement of a cursor rotates three dimensional model 606. In one embodiment, a virtual surface may be constructed such that the panning velocity reaches a maximum at the intersection between the panning surface and stays constant across the virtual surface. In this way, there is a smooth transition from the panning surface to the virtual surface.

To determine the virtual surface, virtual surface calculator module 392 first determines a point where the panning surface connects to the virtual surface. In diagram 600, the panning surface connects to the virtual surface at a point 616. Point 616 may correspond to a parameter defining how tangential the camera has to be to before the virtual surface is used. In an alternative embodiment, point 616 may be the point at which the panning velocity reaches a maximum tolerable threshold. Using point 616, several angles are determined.

A first angle, labeled dθ, is an angle between a screen ray 624 from the user's mouse click and a line segment 618 connecting camera 602 with point 616. A line segment 622 connects center origin 614 with an intersection 626 of the screen ray from the user's mouse click and the panning model. A line segment 620 connects center origin 614 and point 616. A second angle, label dΦ, is an angle between line segment 622 and line segment 620. The angles dθ and dΦ may be small offsets. The ratio of the first angle dΦ to the second angle dθ (e.g., dΦ/dθ) may be the panning velocity.

The ratio between the first angle dθ and the second angle dΦ is then used to determine a virtual surface. The virtual surface may be constructed such that the panning velocity dΦ/dθ stays constant across the entire surface. To do this, a line segment 628 is determined that connects virtual camera 602 and center origin 614. An angle θ is an angle between line segment 628 and a line segment 630 connecting virtual camera 602 and a variable point 632 on a virtual surface. An angle Φ is an angle between line segment 628 and a line segment 634 connecting center origin 614 and variable point 632 on the virtual surface. For each variable point on the virtual surface, angles θ and Φ satisfy the equation:

$$\frac{\Phi - \Phi_0}{d\Phi} = \frac{\theta - \theta_0}{d\theta}, \quad (1)$$

where $\theta_0$ is the angle between screen ray 624 generated using to the user's mouse click and line segment 628 and $\Phi_0$ is an angle between line segment 622 and line segment 628.

In other words, the virtual surface is defined such that if a ray were extended from a virtual camera at angle $\theta$, the ray would intersect the virtual surface at a spherical coordinate having the angle $\Phi$ and origin 614. Rearranging the equation, the spherical coordinate value $\Phi$ can be determined for each angle $\theta$ from the virtual camera as follows:

$$\Phi = (\theta - \theta_0)\frac{d\Phi}{d\theta} + \Phi_0. \quad (2)$$

Using this equation, virtual surface calculator module 392 of FIG. 3 may construct a virtual surface.

In embodiments, a virtual surface may be calculated using other equations that do not substantially differ from equations (1) and (2). For example, coefficients and offsets may be incorporated into the equations.

Referring to FIGS. 3 and 4, GUI 312 may receive a user event. If the user event is a move event, panning module 390 intersects a screen ray with both the panning sphere and virtual surface at step 410. Step 410 is illustrated in FIGS. 7A-B.

Figure 7A:
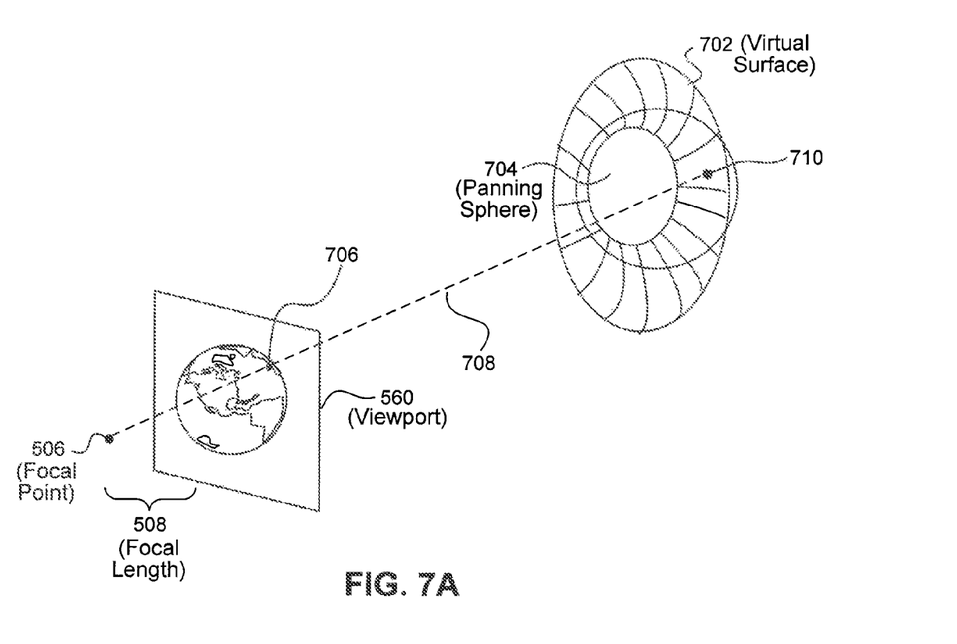
FIGS. 7A-B are diagrams that illustrate determining an intersection with a virtual surface and rotating a three dimensional model according to the method in FIG. 4.

FIG. 7A shows a diagram 700 illustrating extending a screen ray to intersect with a virtual surface. Diagram 700 shows a panning sphere 704 and a virtual surface 702 constructed as described with respect to steps 406 and 408. Diagram 700 also shows a virtual camera with focal point 506, focal length 558 and viewpoint 560. The user may select a new point by, for example, moving a mouse. The point selected by the user corresponds to a point 706 in viewpoint 560. Panning module 390 extends a ray 708 from focal point 506 through point 706. Ray 708 intersects with virtual surface 702 at a point 710.

Figure 7B:
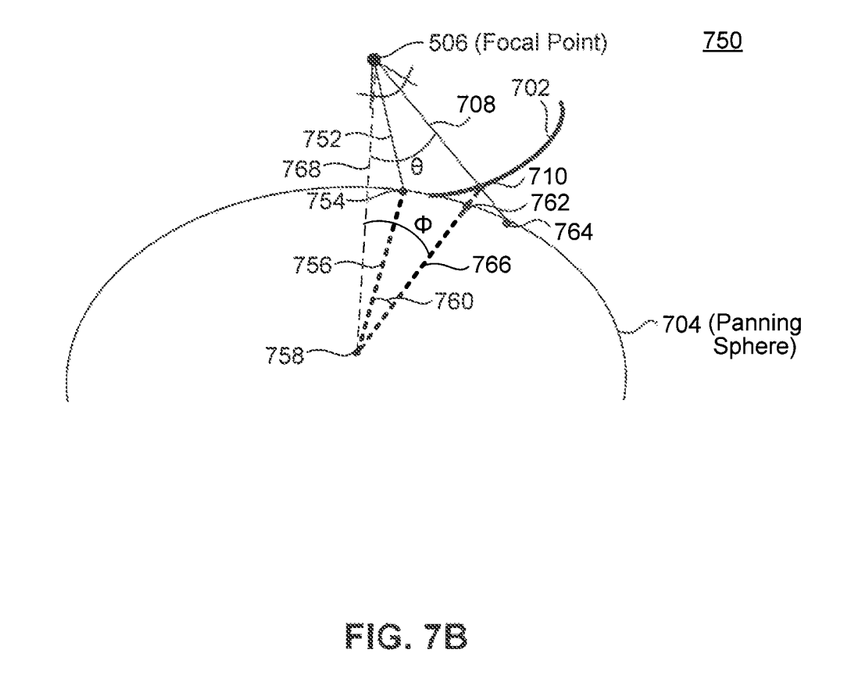

Ray 708 may also intersect with panning sphere 704 as shown in FIG. 7B. FIG. 7B includes a diagram 750. Diagram 750 shows ray 708 intersecting with panning sphere 704 at a point 764.

Again referring to FIGS. 3 and 4, once intersection points 764 and 710 are determined, panning module 390 may select one of the points at step 412. Panning module 390 may select the closest of the points to the virtual camera. In diagram 750, point 710 is closer to focal point 506 than point 764. As point 710 on virtual surface 702 is selected, panning module 390 may project point 710 onto panning sphere 704 at step 414. Panning module 390 may project point 710 onto panning sphere 704 by determining a line segment 766 between point 710 and a center origin 758 of the three dimensional model. Then, panning module 390 determines an intersection between line segment 766 and panning sphere 704 at a point 762.

In an embodiment, point 710 intersecting screen ray 708 and virtual surface 702 may be determined using the sine rule for a triangle. To apply the sine rule, several parameters must be determined. First, a line segment 768 connecting virtual camera 506 and center origin 758 is determined. Second, an angle $\theta$ between line segment 768 and screen ray 708 is determined. Intersection point 710 intersection satisfies the equation:

$$\frac{\sin(\Phi)}{A} = \frac{\sin(\theta + \Phi)}{B}, \quad (3)$$

where B is the length of line segment 768, A is the distance between virtual camera 506 and intersection point 710, and $\Phi$ is an angle between line segment 768 and a line segment connecting virtual camera 506 and intersection point 710. Because the distance A is less then a distance between virtual camera 506 and intersection point 764, the rotation occurs based on point 710 on virtual surface 702. Otherwise, the model would rotate based on intersection point 764 with the panning sphere.

After the intersection point is determined at step 416, rotator module 394 changes a location of three dimensional model according to the points determined in steps 404 and 412. In an embodiment, rotator module 394 changes the location of the model by rotating model according to the points. In FIG. 7B, diagram 750 shows a ray 752 and a hit point 754 determined in response to the mouse click event in step 404. Diagram 750 also shows point 710 determined in response to the move event as described above. A line segment 756 connects hit point 754 with center origin 758, and a line segment 766 connects center origin 758 with point 710. Rotator module 394 rotates the three dimensional model by an angle 760 between line segment 756 and line segment 766.

Referring back to FIG. 3, various components of geographic information system client 300 are described in greater detail.

As described earlier view specification 332 defines the virtual camera's viewable volume within a three dimensional space, known as a frustum, and the position and orientation of the frustum with respect, for example, to a three dimensional map. In accordance with one embodiment of the present invention, view specification 332 specifies three main parameter sets for the virtual camera: the camera tripod, the camera lens, and the camera focus capability. The camera tripod parameter set specifies the following: the virtual camera position: X, Y, Z (three coordinates); which way the virtual camera is oriented relative to a default orientation, such as heading angle (e.g., north?, south?, in-between?); pitch (e.g., level?, down?, up?, in-between?); and yaw/roll (e.g., level?, clockwise?, anti-clockwise?, in-between?). The lens parameter set specifies the following: horizontal field of view (e.g., telephoto?, normal human eye—about 55 degrees?, or wide-angle?); and vertical field of view (e.g., telephoto?, normal human eye—about 55 degrees?, or wide-angle?). The focus parameter set specifies the following: distance to the near-clip plane (e.g., how close to the "lens" can the virtual camera see, where objects closer are not drawn); and distance to the far-clip plane (e.g., how far from the lens can the virtual camera see, where objects further are not drawn).

In one example operation, and with the above camera parameters in mind, assume the user presses the left-arrow (or right-arrow) key. This would signal motion model 318 that the view should move left (or right). Motion model 318 implements such a ground level "pan the camera" type of control by adding (or subtracting) a small value (e.g., 1 degree per arrow key press) to the heading angle. Similarly, to move the virtual camera forward, the motion model 318 would change the X, Y, Z coordinates of the virtual camera's position by first computing a unit-length vector along the view direction (HPR) and adding the X, Y, Z sub-components of this vector to the camera's position after scaling each sub-component by the desired speed of motion. In these and similar ways, motion model 318 adjusts view specification 332 by incrementally updating XYZ and HPR to define the "just after a move" new view position. In this way, motion model 318 is responsible for navigating the virtual camera through the three dimensional environment.

Renderer module 350 has cycles corresponding to the display device's video refresh rate (e.g., 60 cycles per second). In one particular embodiment, renderer module 350 performs a cycle of (i) waking up, (ii) reading the view specification 332 that has been placed by motion model 318 in a data structure accessed by a renderer, (iii) traversing quad node tree 334 in local memory 330, and (iv) drawing drawable data contained in the quad nodes residing in quad node tree 334. The drawable data may be associated with a bounding box (e.g., a volume that contains the data or other such identifier). If present, the bounding box is inspected to see if the drawable data is potentially visible within view specification 332. Potentially visible data is drawn, while data known not to be visible is ignored. Thus, the renderer uses view specification 332 to determine whether the drawable payload of a quad node resident in quad node tree 334 is not to be drawn, as will now be more fully explained.

Initially, and in accordance with one embodiment of the present invention, there is no data within quad node tree 334 to draw, and renderer module 350 draws a star field by default (or other suitable default display imagery). Quad node tree 334 is the data source for the drawing that renderer 350 does except for this star field. Renderer module 350 traverses quad node tree 334 by attempting to access each quad node resident in quad node tree 334. Each quad node is a data structure that has up to four references and an optional payload of data. If a quad node's payload is drawable data, renderer module 350 will compare the bounding box of the payload (if any) against view specification 332, drawing it so long as the drawable data is not wholly outside the frustum and is not considered inappropriate to draw based on other factors. These other factors may include, for example, distance from the camera, tilt, or other such considerations. If the payload is not wholly outside the frustum and is not considered inappropriate to draw, renderer module 350 also attempts to access each of the up to four references in the quad node. If a reference is to another quad node in local memory (e.g., memory 330 or other local memory), renderer module 350 will attempt to access any drawable data in that other quad node and also potentially attempt to access any of the up to four references in that other quad node. The renderer module's attempts to access each of the up to four references of a quad node are detected by the quad node itself.

As previously explained, a quad node is a data structure that may have a payload of data and up to four references to other files, each of which in turn may be a quad node. The files referenced by a quad node are referred to herein as the children of that quad node, and the referencing quad node is referred to herein as the parent. In some cases, a file contains not only the referenced child, but descendants of that child as well. These aggregates are known as cache nodes and may include several quad nodes. Such aggregation takes place in the course of database construction. In some instances, the payload of data is empty. Each of the references to other files comprises, for instance, a filename and a corresponding address in local memory for that file, if any. Initially, the referenced files are all stored on one or more remote servers (e.g., on server(s) of the GIS), and there is no drawable data present on the user's computer.

Quad nodes and cache nodes have built-in accessor functions. As previously explained, the renderer module's attempts to access each of the up to four references of a quad node are detected by the quad node itself. Upon the renderer module's attempt to access a child quad node that has a filename but no corresponding address, the parent quad node places (e.g., by operation of its accessor function) that filename onto a cache node retrieval list 345. The cache node retrieval list comprises a list of information identifying cache nodes to be downloaded from a GIS server. If a child of a quad node has a local address that is not null, the renderer module 350 uses that address in local memory 330 to access the child quad node.

Quad nodes are configured so that those with drawable payloads may include within their payload a bounding box or other location identifier. Renderer module 350 performs a view frustum cull, which compares the bounding box/location identifier of the quad node payload (if present) with view specification 332. If the bounding box is completely disjoint from view specification 332 (e.g., none of the drawable data is within the frustum), the payload of drawable data will not be drawn, even though it was already retrieved from a GIS server and stored on the user's computer. Otherwise, the drawable data is drawn.

The view frustum cull determines whether or not the bounding box (if any) of the quad node payload is completely disjoint from view specification 332 before renderer module 350 traverses the children of that quad node. If the bounding box of the quad node is completely disjoint from view specification 332, renderer module 350 does not attempt to access the children of that quad node. A child quad node never extends beyond the bounding box of its parent quad node. Thus, once the view frustum cull determines that a parent quad node is completely disjoint from the view specification, it can be assumed that all progeny of that quad node are also completely disjoint from view specification 332.

Quad node and cache node payloads may contain data of various types. For example, cache node payloads can contain satellite images, text labels, political boundaries, 3 dimensional vertices along with point, line or polygon connectivity for rendering roads, and other types of data. The amount of data in any quad node payload is limited to a maximum value. However, in some cases, the amount of data needed to describe an area at a particular resolution exceeds this maximum value. In those cases, such as processing vector data, some of the data is contained in the parent payload and the rest of the data at the same resolution is contained in the payloads of the children (and possibly even within the children's descendents). There also may be cases in which children may contain data of either higher resolution or the same resolution as their parent. For example, a parent node might have two children of the same resolution as that parent, and two additional children of different resolutions (e.g., higher) than that parent.

The cache node manager 340 thread, and each of one or more network loader 365 threads, operate asynchronously from renderer module 350 and user interaction module 310. Renderer module 350 and user interaction module 310 can also operate asynchronously from each other. In some embodiments, as many as eight network loader 365 threads are independently executed, each operating asynchronously from renderer module 350 and user interaction module 310. The cache node manager 340 thread builds quad node tree 334 in local memory 330 by populating it with quad nodes retrieved from GIS server(s). Quad node tree 334 begins with a root node when the client system is launched or otherwise started. The root node contains a filename (but no corresponding address) and no data payload. As previously described, this root node uses a built-in accessor function to self-report to the cache node retrieval list 345 after it has been traversed by renderer module 350 for the first time.

In each network loader 365 thread, a network loader traverses the cache node retrieval list 345 (which in the embodiment shown in FIG. 3 is included in cache node manager 340, but can also be located in other places, such as the local memory 330 or other storage facility) and requests the next cache node from the GIS server(s) using the cache node's filename. The network loader only requests files that appear on the cache node retrieval list. Cache node manager 340 allocates space in local memory 330 (or other suitable storage facility) for the returned file, which is organized into one or more new quad nodes that are descendents of the parent quad node. Cache node manager 340 can also decrypt or decompress the data file returned from the GIS server(s), if necessary (e.g., to complement any encryption or compression on the server-side). Cache node manager 340 updates the parent quad node in quad node tree 334 with the address corresponding to the local memory 330 address for each newly constructed child quad node.

Separately and asynchronously in renderer module 350, upon its next traversal of quad node tree 334 and traversal of the updated parent quad node, renderer module 350 finds the address in local memory corresponding to the child quad node and can access the child quad node. The renderer's traversal of the child quad node progresses according to the same steps that are followed for the parent quad node. This continues through quad node tree 334 until a node is reached that is completely disjoint from view specification 332 or is considered inappropriate to draw based on other factors as previously explained.

In this particular embodiment, note that there is no communication between the cache node manager thread and renderer module 350 other than the renderer module's reading of the quad nodes written or otherwise provided by the cache node manager thread. Further note that, in this particular embodiment, cache nodes and thereby quad nodes continue to be downloaded until the children returned contain only payloads that are completely disjoint from view specification 332 or are otherwise unsuitable for drawing, as previously explained. Display interface 380 (e.g., a display interface card) is configured to allow data from a mapping module to be sent to a display associated with the user's computer, so that the user can view the data. Display interface 380 can be implemented with conventional technology.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for panning a virtual camera in a three dimensional environment, comprising:
   determining a first point located on a panning sphere in a three dimensional model in the three dimensional environment;
   determining a virtual surface according to the first point, the three dimensional model, and a position of the virtual camera in the three dimensional environment;
   determining a second point located on the panning sphere;
   determining a third point located on the virtual surface, wherein the second point on the panning sphere is associated with the third point on the virtual surface, and wherein the distance between the virtual camera and the third point is less than the distance between the virtual camera and the second point; and
   changing a location of the three dimensional model by rotating the three dimensional model according to the third point, wherein the rotation of the three dimensional model according to the third point is less than a rotation of the three dimensional model according to the second point, and
   wherein the determining of the virtual surface comprises fitting the virtual surface to the panning sphere so that the virtual surface is a concave surface from a perspective of the virtual camera.

2. The method of claim 1, wherein the determining of the virtual surface further comprises:
   configuring the panning sphere, wherein a center of the panning sphere is located at the center of the three dimensional model, and wherein the panning sphere has a radius equal to a distance between the center of the three dimensional model and the first point; and
   fitting the virtual surface and the panning surface together form a continuous surface that fits smoothly with the panning sphere.

3. The method of claim 2, wherein the three dimensional model includes a model of the Earth.

4. The method of claim 1, wherein the determining of the virtual surface further comprises that the virtual surface is a mirror image of a portion of the panning sphere.

5. The method of claim 1, wherein the determining of a first point comprises:
   extending a first ray from a focal point of the virtual camera through a fourth point on a viewport of the virtual camera, the fourth point corresponding to a first user selection; and
   determining the first point at an intersection between the first ray and the three dimensional model.

6. The method of claim 5, wherein the determining of the virtual surface comprises,
   determining a panning sphere, wherein a center of the panning sphere is located at a center of the three dimensional model and wherein the panning sphere has a radius equal to a distance between the center of the three dimensional model and the first point; and
   determining a virtual surface connected to the panning sphere at a connecting point, wherein the virtual surface substantially satisfies an equation $$\frac{\Phi - \Phi_0}{d\Phi} = \frac{\theta - \theta_0}{d\theta},$$

wherein $\theta_0$ is an angle between the first ray and a line segment connecting the virtual camera and a center of the three dimensional model, wherein $\Phi_0$ is an angle between the first line segment connecting the virtual camera and the center of the three dimensional model and a second line segment connecting the center of the three dimensional model and the first point, wherein $d\Phi$ is an angle between the second line segment connecting the center of the three dimensional model and the first point and a third line segment connecting the center of the three dimensional model and the connecting point, wherein $d\theta$ is an angle between the first ray and a third line segment connecting the virtual camera and the connecting point, wherein $\theta$ is an angle between the second line segment connecting the virtual camera and the center of the three dimensional model and a fourth line segment connecting the virtual camera and a variable point on the virtual surface, and wherein $\Phi$ is an angle between the second line segment connecting the virtual camera and the center of the three dimensional model and a fifth line segment connecting the center of the three dimensional model and the variable point on the virtual surface.

7. The method of claim 1, wherein the determining a third point on the virtual surface comprises:
   extending a second ray from the focal point of the virtual camera through the second point on the panning sphere; and
   determining the third point at an intersection between the second ray and the virtual surface.

8. A system for panning a virtual camera in a three dimensional environment, comprising:
   a panning module, utilizing a computing device, configured to determine a first point and a second point located on a panning sphere in a three dimensional environment, the panning module further configured to determine a third point on a virtual surface, wherein the second point is associated with the third point,
   a virtual surface calculator module, utilizing the computing device, configured to determine the virtual surface according to the first point, the three dimensional model, and a position of the virtual camera in the three dimensional environment; and
   a rotator module, utilizing the computing device, configured to change a location of the three dimensional model, by rotating, according to the third point,
   wherein the distance between the virtual camera and the third point is less than the distance between the virtual camera and the second point,
   wherein the rotation of the three dimensional model according to the third point is less than a rotation of the three dimensional model according to the second point, and
   wherein the determining of the virtual surface comprises fitting the virtual surface to the panning sphere so that the virtual surface is a concave surface from a perspective of the virtual camera.

9. The system of claim 8, wherein a center of the panning sphere is located at the center of the three dimensional model, and wherein the panning sphere has a radius equal to a distance between the center of the three dimensional model and the first point, and
   wherein the panning module is configured to fitting the virtual surface to the panning surface such that the virtual surface and the panning surface together form a continuous surface that fits smoothly with the panning sphere.

10. The system of claim 9, wherein the three dimensional model includes a model of the Earth.

11. The system of claim 8, wherein the virtual surface is a mirror image of a portion of the panning sphere.

12. The system of claim 8, wherein the panning module is configured to extend a first ray from a focal point of the virtual camera through a fourth point on a viewport of the virtual camera, the fourth point corresponding to a first user selection, and
   wherein the panning module is configured to determine the first point at an intersection between the first ray and the three dimensional model.

13. The system of claim 12, wherein the panning module is configured to determine a panning sphere, wherein a center of the panning sphere is located at a center of the three dimensional model and wherein the panning sphere has a radius equal to a distance between the center of the three dimensional model and the first point, and
   wherein the virtual surface calculator module is configured to determine a virtual surface connected to the panning sphere at a connecting point, wherein the virtual surface substantially satisfies an equation $$\frac{\Phi - \Phi_0}{d\Phi} = \frac{\theta - \theta_0}{d\theta},$$

wherein $\theta_0$ is an angle between the first ray and a line segment connecting the virtual camera and a center of the three dimensional model, wherein $\Phi_0$ is an angle between the first line segment connecting the virtual camera and the center of the three dimensional model and a second line segment connecting the center of the three dimensional model and the first point, wherein $d\Phi$ is an angle between the second line segment connecting the center of the three dimensional model and the first point and a third line segment connecting the center of the three dimensional model and the connecting point, wherein $d\theta$ is an angle between the first ray and a third line segment connecting the virtual camera and the connecting point, wherein $\theta$ is an angle between the second line segment connecting the virtual camera and the center of the three dimensional model and a fourth line segment connecting the virtual camera and a variable point on the virtual surface, and wherein $\Phi$ is an angle between the second line segment connecting the virtual camera and the center of the three dimensional model and a fifth line segment connecting the center of the three dimensional model and the variable point on the virtual surface.

14. The system of claim 8, wherein the panning module is configured to extend a second ray from the focal point of the virtual camera through the second point on the panning sphere; and determine the third point at an intersection between the second ray and the virtual surface.

15. A computer-implemented method for panning a virtual camera in a three dimensional environment including a three dimensional model of the Earth, comprising:
- displaying in a display area the three dimensional model from a perspective of the virtual camera;
- enabling a user to select a first point on a panning sphere in the three dimensional model within the display area with a cursor;
- determining a screen ray between the virtual camera and the first point;
- determining an intersection point between the screen ray and a virtual surface; and
- rotating the three dimensional model around an axis through a rotation point of the three dimensional modal until the virtual camera is aligned with the intersection point on the virtual surface and the rotation point of the three dimensional model,
- wherein the rotation of the three dimensional model according to the intersection point is less than a rotation of the three dimensional model according to the first point and
- wherein the determining, of the virtual surface comprises fitting the virtual surface to the panning sphere so that the virtual surface is a concave surface from a perspective of the virtual camera.

* * * * *